(12) United States Patent
Basalamah

(10) Patent No.: US 9,621,513 B2
(45) Date of Patent: Apr. 11, 2017

(54) METHOD AND PROCESS FOR AUTONOMOUS HUMAN DATA MULING USING ELECTRONIC COMMUNICATION DEVICES

(71) Applicant: Umm Al-Qura University, Makkah (SA)

(72) Inventor: Anas Basalamah, Makkah (SA)

(73) Assignee: Umm-Al-Qura University, Makkah (SA)

( * ) Notice: Subject to any disclaimer, the term of this patent is extended or adjusted under 35 U.S.C. 154(b) by 139 days.

(21) Appl. No.: 14/605,676

(22) Filed: Jan. 26, 2015

(65) Prior Publication Data

US 2015/0281175 A1 Oct. 1, 2015

Related U.S. Application Data

(63) Continuation of application No. PCT/IB2014/001520, filed on Apr. 1, 2014.

(51) Int. Cl.
| | |
|---|---|
| *H04L 29/12* | (2006.01) |
| *H04L 29/08* | (2006.01) |
| *H04W 4/00* | (2009.01) |
| *H04W 48/12* | (2009.01) |
| *H04W 84/12* | (2009.01) |

(52) U.S. Cl.
CPC .............. *H04L 61/35* (2013.01); *H04L 67/12* (2013.01); *H04W 4/006* (2013.01); *H04W 48/12* (2013.01); *H04L 61/103* (2013.01); *H04L 61/6004* (2013.01); *H04W 84/12* (2013.01)

(58) Field of Classification Search
CPC ....... H04L 61/35; H04L 67/12; H04L 61/103; H04L 61/6004; H04W 4/006; H04W 48/12; H04W 84/12
See application file for complete search history.

(56) References Cited

U.S. PATENT DOCUMENTS

| | | | | |
|---|---|---|---|---|
| 2003/0236916 | A1* | 12/2003 | Adcox | H04L 29/12018 709/245 |
| 2004/0059909 | A1* | 3/2004 | Le Pennec | H04L 63/1466 713/153 |
| 2004/0062267 | A1* | 4/2004 | Minami | H04L 12/5693 370/463 |

(Continued)

*Primary Examiner* — Ajay Cattungal
(74) *Attorney, Agent, or Firm* — Geeta Kadambi; Riddhi IP LLC

(57) ABSTRACT

The present invention is related to a method of transferring sensor data in a delay insensitive network through wireless medium conforming to WiFi standards using smart devices as mules. The method works seamlessly without using extra processing cycles or data bandwidth than what would normally be used by the standards. The method also works without disturbing the owner of the smart device (Mule) for any permission. The innovative method uniquely embeds the sensor data as part of the IP address and uses the address as the carrying mechanism of the data itself. When the smart device reaches the vicinity of the collection hub, the method in the collection hub uniquely elicits the sensor data which is embedded in the IP address by initiating an ARP sequence at the smart device. Once the data is obtained the connection is terminated. The method works in any smart device that uses WiFi standard.

8 Claims, 16 Drawing Sheets

(56) References Cited

U.S. PATENT DOCUMENTS

2006/0229896 A1* 10/2006 Rosen ................ G06Q 10/1053
705/321
2011/0230986 A1* 9/2011 Lafortune ............ A43B 3/0005
700/93
2014/0257855 A1* 9/2014 Moore ................ G06F 19/3418
705/3

* cited by examiner

METHOD AND PROCESS FOR AUTONOMOUS HUMAN DATA MULING USING ELECTRONIC COMMUNICATION DEVICES

CROSS REFERENCE TO RELATED APPLICATION

The instant application claims priority to PCT/IB2014/001520 filed on 1 Apr. 2014. The pending PCT application is hereby incorporated by reference in its entireties for all of its teachings.

FIELD OF TECHNOLOGY

The present invention relates to a method and process for autonomous data muling using electronic communication devices used by human. More specifically transferring sensor data packets from sensors to data collection hubs seamlessly in a delay tolerant network.

BACKGROUND

Presently, sensor nodes collecting visual sensing data, such as camera collected media data, use a fixed wireless access and back haul node to communicate the data to the data collection hub. In some places, where sensor collects data, such as garbage bin available capacity information, buffers the data and waits for a mobile sensor node to come by in order for data to be communicated.

In city municipal services department, the city services data, such as parking information communicate the data through a wireless node that is fixed close enough to collect the information 24×7 to know the status of the parking and the time expiry status.

In general, sensor data collected are either transmitted securely using wired or wireless network. Data collected may be hard-real-time or soft-real-time in nature. In hard-real-time sensor data, loss of a single datum could lead to inconsistency and catastrophe in the final collection and decision making at the data collection hub. The requirement here is to provide a very secure channel that is not delay tolerant to carry the data to the collection hub.

In general, hard-real-time sensor data collected through sensors for military or security applications, have dedicated network collection elements that carry the data through its private network channel leading to real time secure communication. This is achieved through a significant cost as the infrastructure fully belongs to the network owner and not used for anything else. There is a need for an efficient and prompt transfer of data for everyday use.

SUMMARY

Several methods, process and system for data muling using mobile devices, mobile technology and electronic medium comprising computer, computer like hardware and machine-readable medium are disclosed. In one embodiment, wireless infrastructure that has extra security padded into the network layer is used.

In soft-real-time data, loss of a sequence of data is tolerated at the final collection hub as meaningful decision can be made with the data that has reached. In one embodiment, a method is provided that is inexpensive and delay tolerant to carry the data to the collection hub.

For soft-real-time data collected through sensors for non-military type applications, such as enterprise security, the network usually carry the data using the infrastructure owned by the enterprise. They share the network which transmits and receives other type of packets. However the cost of the network is shared between sensor data communication and other application. The sensor data is generally carried securely through a virtual private channel or Virtual Private Network (VPN).

There are situations where the data is collected for statistical purposes. For example, the maximum rainfall for the day, or highest humidity of the day, or the low/high temperature of the day. In those cases, it becomes cumbersome to transfer data from a location where there is no established infrastructure, and there is no economic sense in installing a node to carry the data to the collection hub. Enterprises generally use 4G or wireless cellphone infrastructure to relay such short stream of data at an expense attached to the enterprise, even though the data is non-real-time and every sensor would need a SIM card. Even if SIM card is weighed upon, the cell phones are not covered in most areas. Therefore it is a question of coverage, availability and cost.

In the present disclosure a novel method and apparatus for transmission of non-real-time sensor data to the collection hub through wireless devices carried by general populace is disclosed. Human data muling is the process of utilizing humans carrying smart devices as mules for delivering packets from sensors to data collection hubs. The method to use a general purpose device, not owned or operated by the sensor device enterprise, to carry data to the collection hub is a novel idea.

The disclosure presents a method that is not invasive either on the human who carries the device or the smart device. The method uses the existing wireless protocol to mule the data to the collection hub using the smart device. The disclosed method is inexpensive, as the smart device is not owned by the enterprise that collects the sensor data. The method uses the smart devices used by the people who are passing by the sensor data collection access point and hence the investment on devices is nonexistent.

The disclosed method uses the smart devices carried by people who are in proximity of the sensor collecting device. To make the whole interaction noninvasive, the method uses a new mapping function between IP address and the sensor data to convey the sensor data result to the mule (i.e., the smart device) to carry it to the collection hub. The disclosed invention shows a novel method to cloak the Access Point (AP) to behave as if it were an AP that the Smart device is familiar with and has already associated with earlier. The disclosed method works with any smart devices and portable tablets that use standard WiFi protocol and expose media access control (MAC) and IP addresses of previous connections (e.g. Apple devices). The method does not use any extra bandwidth or extra processing cycles than what would normally be a part of handling standard related message processing.

The disclosed method is scalable and fault tolerant through redundancy. The sensor data is sent through various smart devices as mule and the data is gathered in the collection hub. The idea is to send the small amount of data gathered at the sensors through various smart devices to increase the chance of one of them getting through to the collection hub.

Other features will be apparent from the accompanying figures and from the detailed description that follows.

BRIEF DESCRIPTION OF THE DRAWINGS

Example embodiments are illustrated by way of example and no limitation in the graph and in the accompanying figures, like references indicate similar elements and in which.

Figure 1:
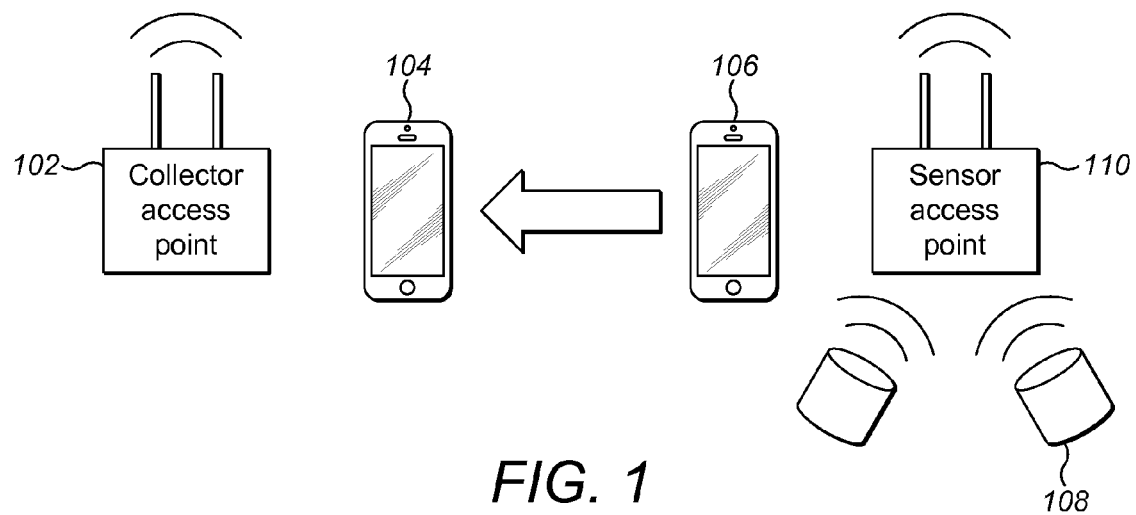
FIG. 1 is a diagram illustrating the Sensor access point collecting data through various sensors attached to it.

Other features of the present embodiments will be apparent from the accompanying detailed description that follows.

DETAILED DESCRIPTION

The present disclosure relates to an apparatus to communicate sensor data using smart devices as mules for delivering packets from sensor to data collection hubs. Transfer using wired network, though safe, may not be possible where wired infrastructure is not available. For example, sensors in remote communities that are in border areas do not have wired infrastructure such as Cable and Fiber. Here wireless infrastructure that has extra security padded into the network layer is used.

In soft-real-time data, loss of a sequence of data is tolerated at the final collection hub as meaningful decision can be made with the data that has reached. Therefore the requirement here is to provide a channel that is inexpensive and delay tolerant to carry the data to the collection hub.

For soft-real-time data collected through sensors for non-military type applications, such as enterprise security, the network usually carry the data using the infrastructure owned by the enterprise. They share the network which transmits and receives other type of packets. However the cost of the network is shared between sensor data communication and other application. The sensor data is generally carried securely through a virtual private channel or Virtual Private Network (VPN). Transfer using wired network, though safe, may not be possible where wired infrastructure is not available. For example, sensors in remote communities that are in border areas do not have wired infrastructure such as Cable and Fiber.

There are situations where the data is collected for statistical purposes. For example, the maximum rainfall for the day, or highest humidity of the day, or the low/high temperature of the day. In those cases, it becomes cumbersome to transfer data from a location where there is no established infrastructure, and there is no economic sense in installing a node to carry the data to the collection hub. Enterprises generally use 4G or wireless cellphone infrastructure to relay such short stream of data at an expense attached to the enterprise, even though the data is non-real-time and every sensor would need a SIM card. Even if SIM card is weighed upon, the cell phones are not covered in most areas. Therefore it is a question of coverage, availability and cost.

In the present disclosure a novel method and apparatus for transmission of non-real-time sensor data to the collection hub through wireless devices carried by general populace is disclosed. Human data muling is the process of utilizing humans carrying smart devices as mules for delivering packets from sensors to data collection hubs. The method to use a general purpose device, not owned or operated by the sensor device enterprise, to carry data to the collection hub is a novel idea.

The disclosure presents a method that is not invasive either on the human who carries the device or the smart device. The method uses the existing wireless protocol to mule the data to the collection hub using the smart device. The disclosed method is inexpensive, as the smart device is not owned by the enterprise that collects the sensor data. The method uses the smart devices used by the people who are passing by the sensor data collection access point and hence the investment on devices is nonexistent. The disclosed method uses the smart devices carried by people who are in proximity of the sensor collecting device. To make the whole interaction noninvasive, the method uses a new mapping function between IP address and the sensor data to convey the sensor result to the mule (i.e., the smart device) to carry it to the collection hub.

The disclosed invention shows a novel method to cloak the Access Point (AP) to behave as if it were an AP that the Smart device is familiar with and has already associated with earlier. The disclosed method works with any smart devices and portable tablets that use standard WiFi protocol and expose MAC and IP addresses of previous connections (e.g. Apple devices). The method does not use any extra bandwidth or extra processing cycles than what would normally be a part of handling standard related message processing.

The disclosed method is scalable and fault tolerant through redundancy. The sensor data is sent through various smart devices as mule and the data is gathered in the collection hub. The idea is to send the small amount of data gathered at the sensors through various smart devices to increase the chance of one of them getting through to the collection hub.

Wireless Network: The present invention relates to wireless network, where a set of autonomous nodes are connected through wireless links. The assumption is that every autonomous node has a radio RF card inside it that provides Transmit (TX) and Receive (RX) functionality to communicate data between neighboring autonomous node.

The instant disclosure relates to a general purpose wireless network using well known IEEE 802.11 based WiFi standard, where smart devices communicate between each other using the standard.

Wireless Sensor Network: A sensor network consists of a set of sensors or sensor nodes connected together. A wireless sensor network is a wireless network (as defined above) where at least one autonomous node is a sensor node. The sensor node sends information to a data collection hub through wireless network.

FIG. 1 is a diagram illustrating the Sensor access point collecting data through various sensors attached to it. The smart devices (the mule that carries the data) associates with the sensor access point. The smart device moves around and reaches close to the Collector access point to transfer the data at the collector hub through the Collector access point. The sensor nodes 108 are connected to a Sensor access point 110 that operates using the WiFi standard thus enabled to communicate between the access point and smart devices 106.

The smart devices 104, also operating using WiFi standard, communicates with the Collector access point 102. Collector access point 102 is connected to the data collection hub. Collection access point sends the sensor data received from the smart device 104, namely the mule, to the data collection hub.

The end to end network consists of Collection side and the Reporting side. In the collection side, not to be confused with Collector, there are multiple sensors 108, a Sensor access point 110 that collects information on a regular basis from the Sensors 108, and a smart device to receive that data, namely a mule 106. On the reporting side, the mule that has carried the data 104, the Collector access point 102 that receives the data from the mule 104 to give it to data collection hub are present.

The main contribution is to furnish a new method of communicating sensor data from the sensors to the collection hub using smart devices that work uses IEEE 802.11a/b/g/n standards, commonly known as WiFi standard as mules without the owner of the smart devices realizing it directly.

Figure 2:
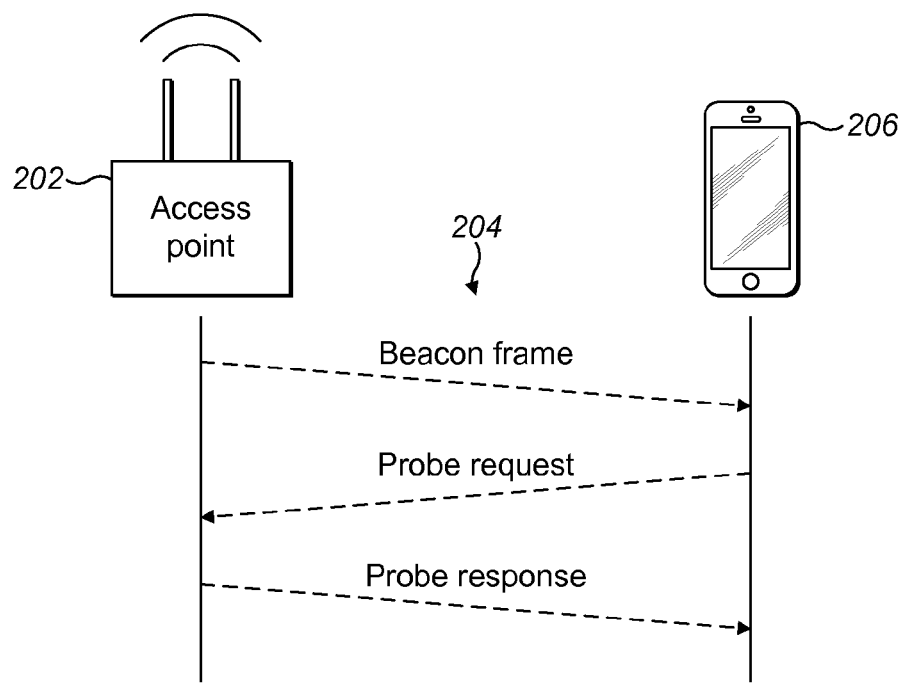
FIG. 2 is a depiction of the standard WiFi network discovery message sequence that happens between an access point and the smart device to identify each other.

FIG. 2 is a depiction of the standard WiFi network discovery message sequence that happens between an access point and the smart device to identify each other. The Beacon Frames are periodically sent by the Access Point (AP) to advertise its presence. The Probe Request message is normally sent by the smart device to request an association for which the AP replies back with a Probe Response message. The general operation of a WiFi standard based smart device 206 involves advertising itself to the nearby Access Points 202 using a Probe Request message 204 either independently or as a reply to the Beacon frame 204 sent by the Access point 202 from time to time. When the Access point 202 receives the Probe request 204 from the smart device 206, it replies back using a Probe response 204. FIG. 2 shows the message sequence for a Standard WiFi network discovery.

Figure 3:
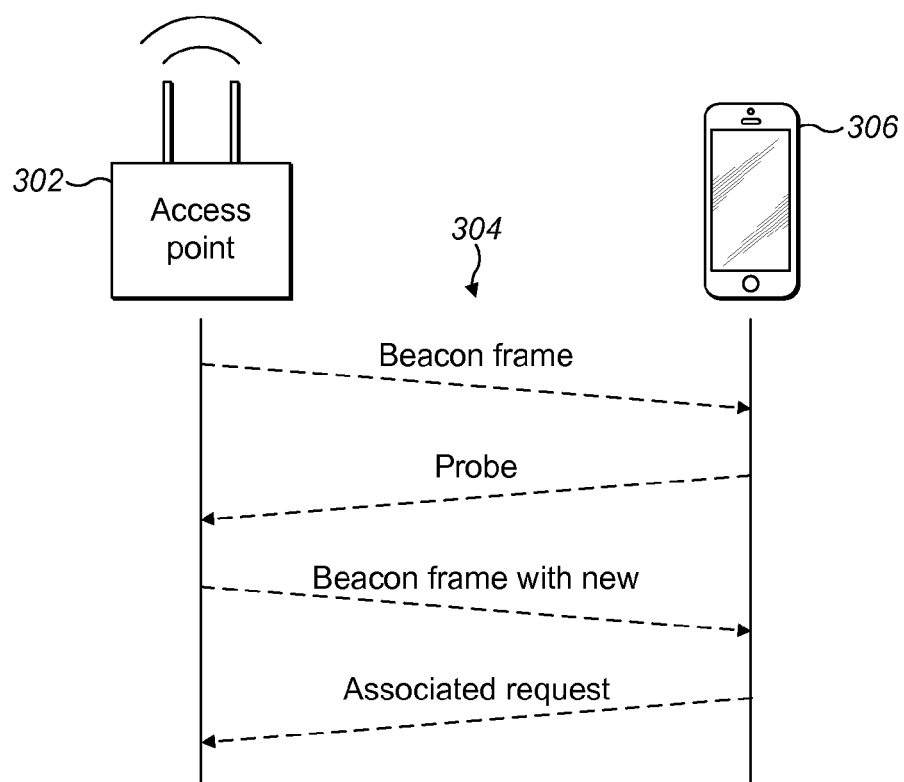
FIG. 3 shows the message sequence diagram of the discovery. The Beacon frame is periodically sent from the Access Point (AP) to identify its availability.

FIG. 3 shows the message sequence diagram of the discovery. The Beacon frame is periodically sent from the Access Point (AP) to identify its availability. The smart device that listens to the beacon frame sends a Probe request for which the AP replies with a new SSID. Even if the AP does not send the beacon frame, probe requests are sent by smart devices. Upon receiving the SSID, the smart device requests to associate with the AP. When an access point 302 sends a beacon frame message 304, a smart device 306 responds with a probe request message. A smart device has the capability of sending a probe request message on its own as well. When the access point 302 determines to admit the smart device for connectivity, it sends a probe response frame. On receipt the smart device 306, can initiate an association using an association request message. The exchange of these proposed message sequence is given in FIG. 3. Please note that in FIG. 3, the message sequence shows the probe request message from smart device as a reply to a beacon frame message.

Figure 4:
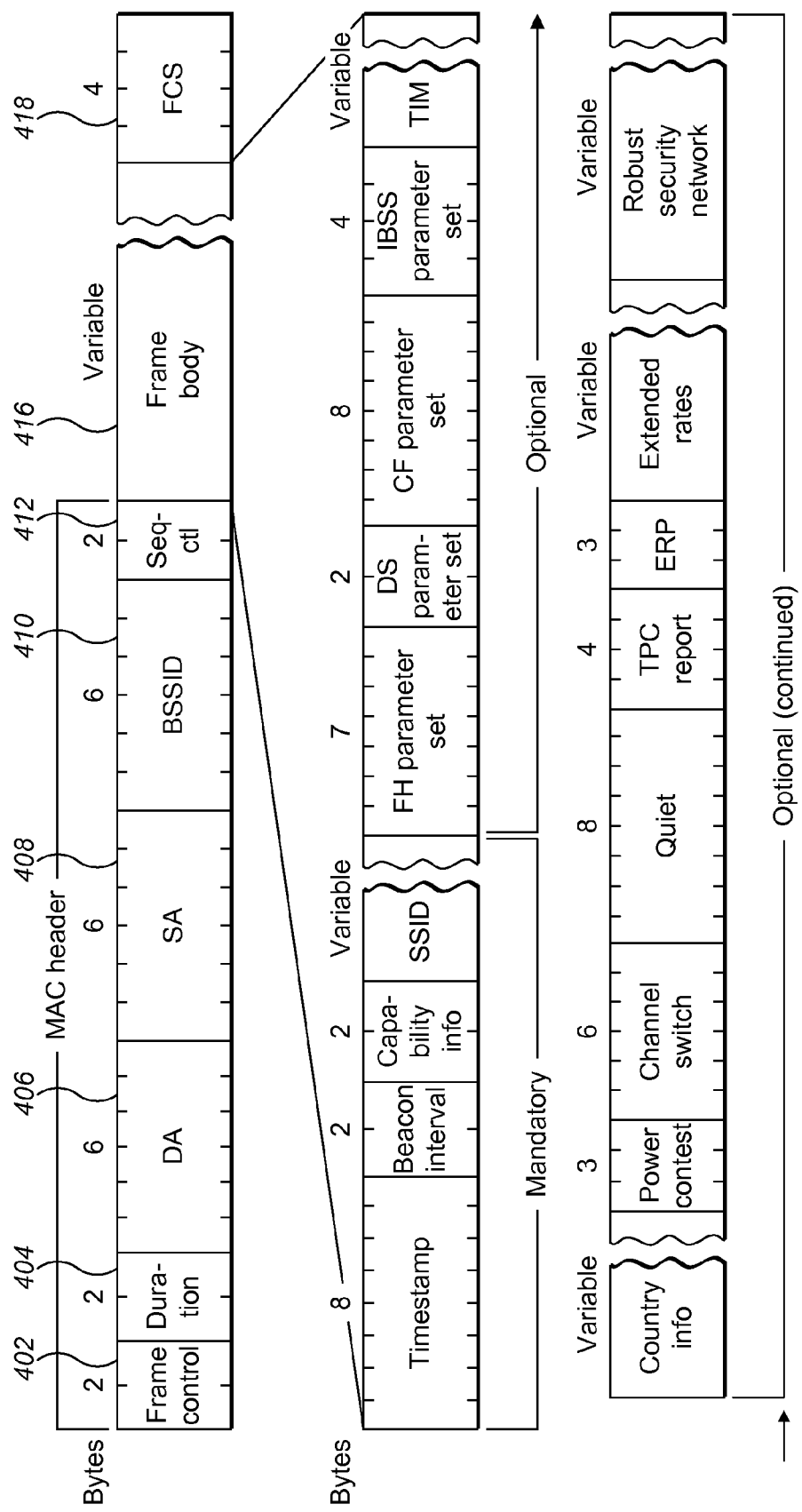
FIG. 4 shows the frame format for the Beacon frames. It can clearly be seen that the Base station SSID is broadcast to identify the AP's presence.

FIG. 4 shows the frame format for the Beacon frames. It can clearly be seen that the Base station SSID is broadcast to identify the AP's presence. Every single message has a frame format clearly defined as part of the standard. The frame consists of the Media Access (MAC) Layer header and other mandatory and optional parameters. The beacon frame provides the destination 406 and source 408 addresses along with the Base station ID 410.

Figure 5:
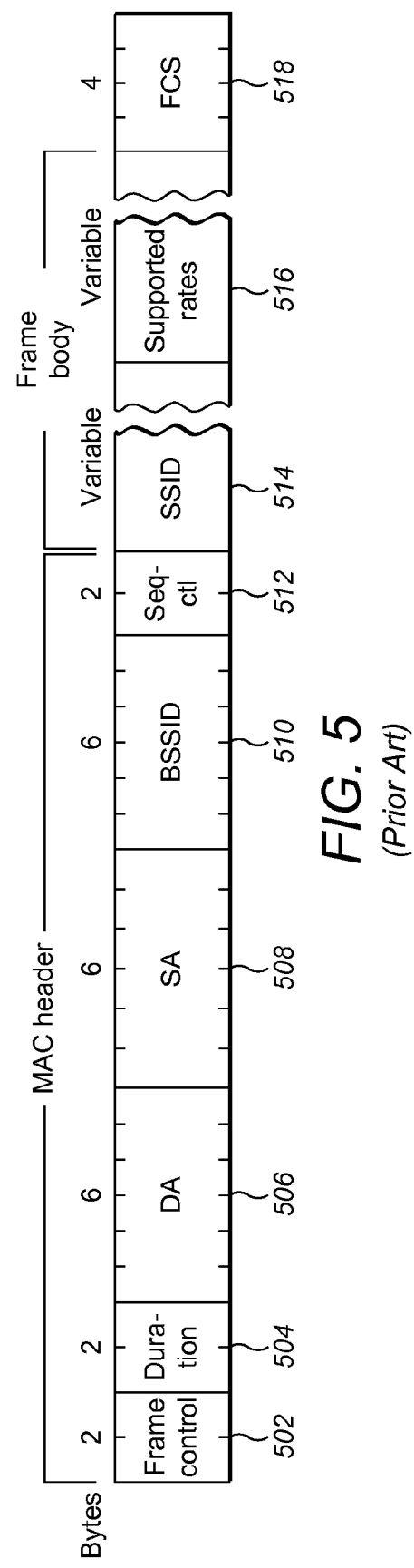
FIG. 5 shows the Probe Request frame format sent by the Smart device.
Figure 6:
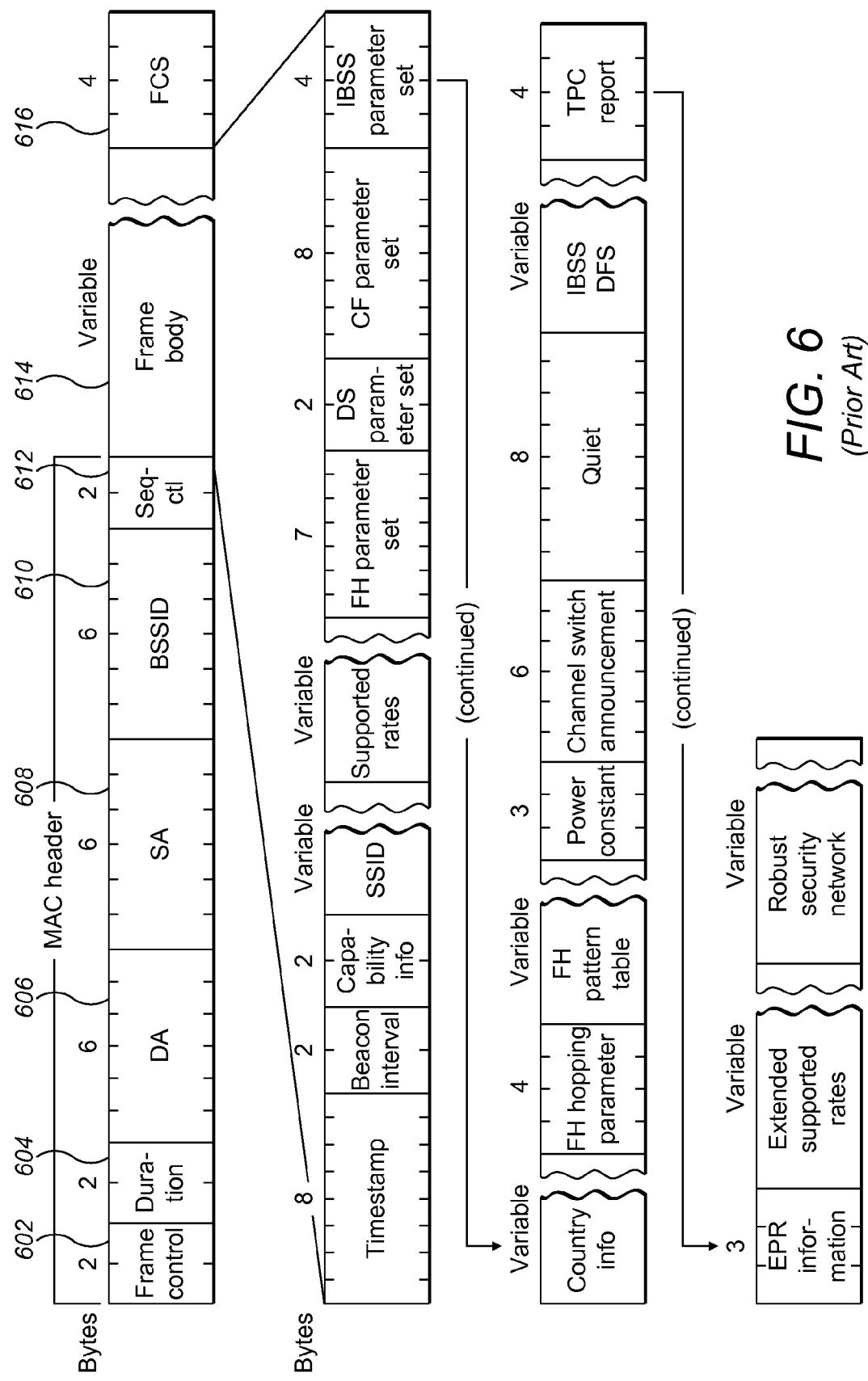
FIG. 6 shows the Probe Response frame format, where the AP responds to the Probe Request from the smart device. The AP advertises all the parameters to enable the connection.

FIG. 5 shows the Probe Request frame format sent by the Smart device. It can be seen the advertisement by the Smart devices to the AP contains information on the data rates and SSID. The smart device 306 replies with its own Probe Request 204 using the frame format given in FIG. 5. It can clearly be seen that the frame consists of the MAC layer header [502 to 514] and the frame body [514-518] which transfers information regarding the supported rates. FIG. 6 shows the Probe Response frame format, where the AP responds to the Probe Request from the smart device. The AP advertises all the parameters to enable the connection. The probe response coming from the access point 202 provides information about the SSID and the supported rates as part of the frame body, in addition to the MAC address [608-612].

Let us first see the steps taken at the sensor side to obtain data and sending through the smart device, namely the Mule.

Figure 7:
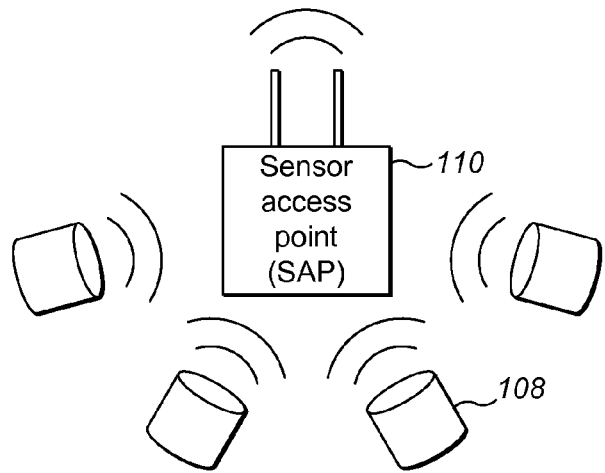
FIG. 7 shows a typical AP that caters to various sensors, namely Sensor Access Point (SAP).

In order to procure the data from the sensors 108, we require a sensor access point 110. FIG. 7 shows a typical AP that caters to various sensors, namely Sensor Access Point (SAP). SAP collects data from the sensors and readies itself to communicate that data to the collection hub. Multiple sensors can be connected to a single Sensor Access Point (SAP) 110 as shown in FIG. 7. The SAP collects data from the sensors and relays to the collection hub through passing by smart devices.

Figure 8:
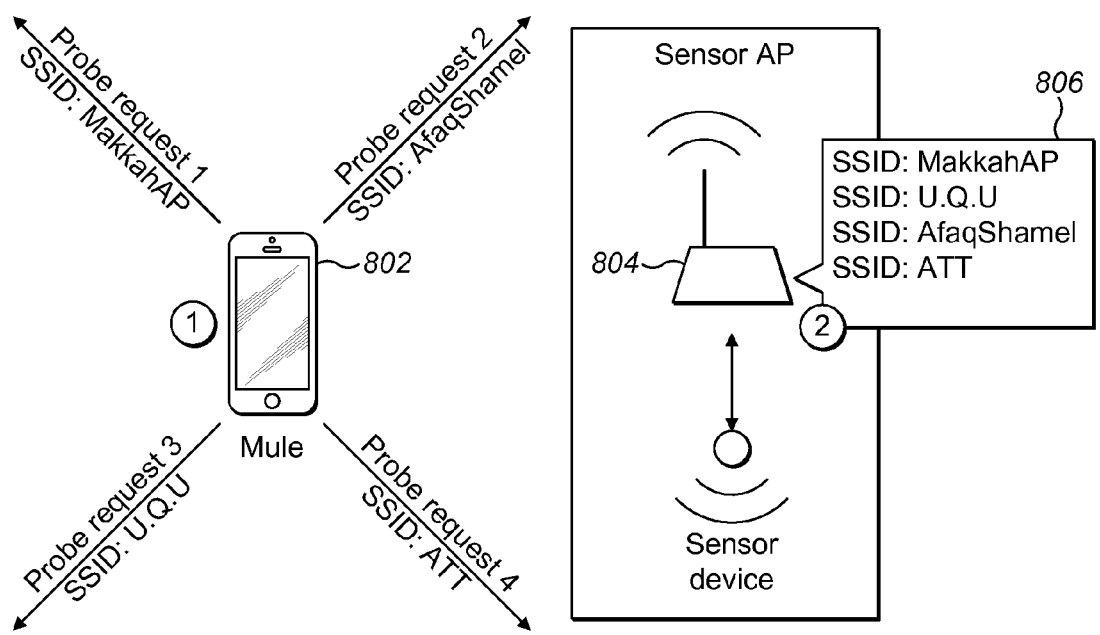
FIG. 8 depicts the behavior of the Smart device and SAP.

FIG. 8 depicts the behavior of the Smart device and SAP. Probe Request sent by the Smart device communicates the SSIDs of the previously associated network. The SAP learns those network SSIDs to make use of the Smart device as a mule to carry the data. The SAP that is connected to sensors is always on to collect the data from the sensors periodically. They receive the data and transmit through the smart devices 802 that try and establish connection to Internet through the SAP. SAP transmits the beacon message periodically 804 to announce its existence. The smart device 802 sends probe request periodically all the time. Therefore, the smart device 802 that comes within the sphere of influence of SAP sends probe requests as per the standard within the periodicity that it has been configured to send. These requests are received by the SAP. In FIG. 8, in Step 1, it is shown as an example, the smart device mule 802 sending four probe requests with various SSIDs that it already possesses. The example also shows in Step 2, the SAP receiving the four SSIDs 806 sent by the smart devices.

Figure 9:
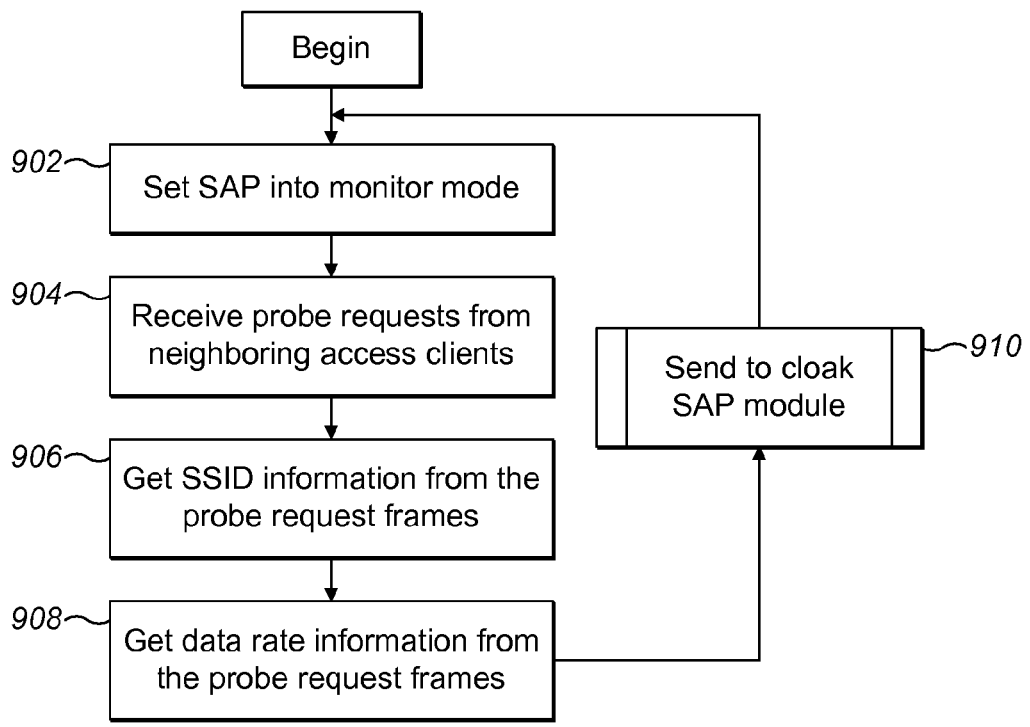
FIG. 9 shows the steps taken as part of the Probe Request Registration in SAP.

FIG. 9 shows the steps taken as part of the Probe Request Registration in SAP. SAP, acting in monitor mode, receives the Probe Requests and collects the past association SSID information from the Smart devices along with the data rate in which it wishes to operate. The first step towards making the innovation of using smart device mule carry data from SAP to collection hub work is detailed in FIG. 9. The steps taken by the SAP is important as SAP receives the Probe request from prospective Mules and sends a cloak SAP entry. To do this, first the SAP is set to monitor mode 902 so that it is in a position to receive the probe request message. The receive module 904 obtains the probe requests from the neighboring access clients, namely the smart devices or the Mule. After obtaining the probe request message, the SAP deciphers the SSID information from the message 906. Once the data rate and SSID is obtained, cloak SAP module is invoked within the SAP.

Figure 10:
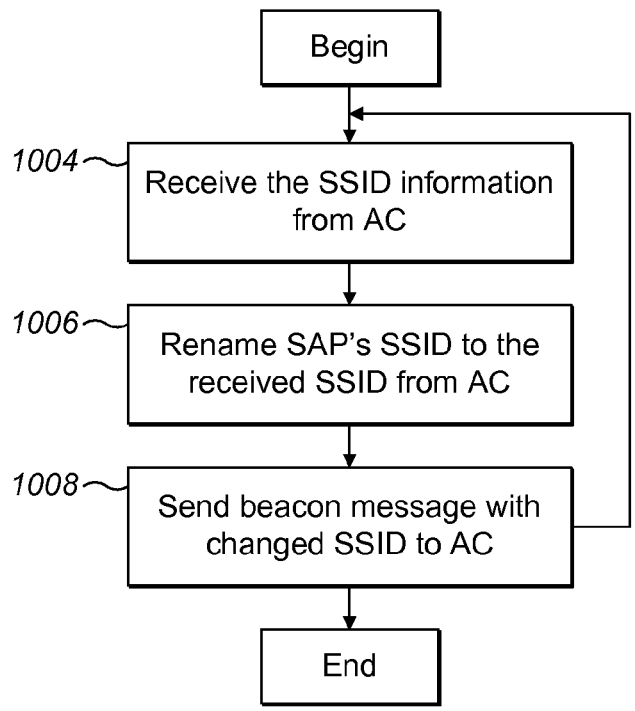
FIG. 10 shows the method in which the SAP cloaks the AP to act as if it were an AP with another SSID that was learnt from the Probe Request of Smart device.

FIG. 10 shows the method in which the SAP cloaks the AP to act as if it were an AP with another SSID that was learnt from the Probe Request of Smart device. This enables the SAP to send a Beacon message with the SSID that was sent by Smart device through its Probe Request message to make Smart device believe that the SAP is an AP that it had interacted and associated with earlier. FIG. 10 details the Cloak SAP module, where the Access Client (AC) namely the Smart device or Mule's SSID information is taken and the SAP's SSID is renamed to the Mule's transferred SSID. After which, a probe response message as shown in FIG. 6 is sent back to the Mule. Now the Mule believes that it has received a message from the SSID it had advertised and hence is ready to get associated.

Figure 11:
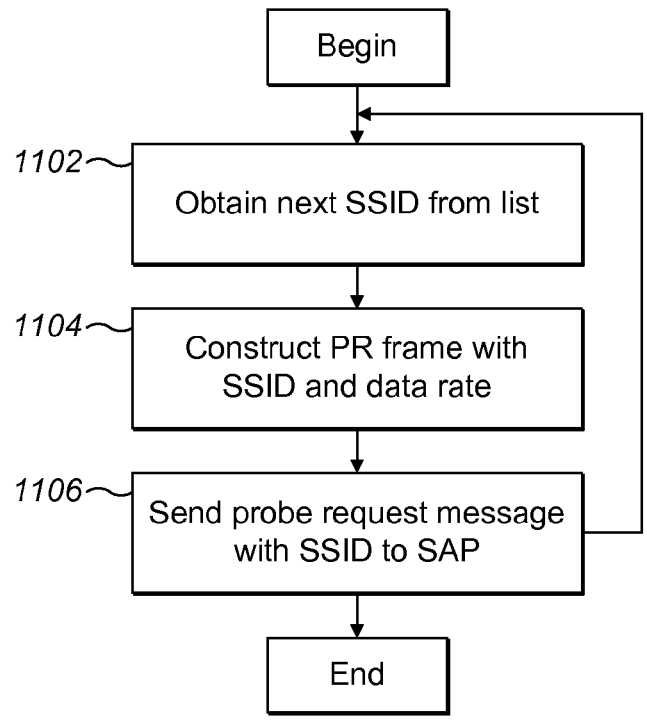
FIG. 11 shows the Smart device, which is the Access Client (AC) here, sending Probe Request message to the SAP revealing its list of previously associate SSIDs.
Figure 12:
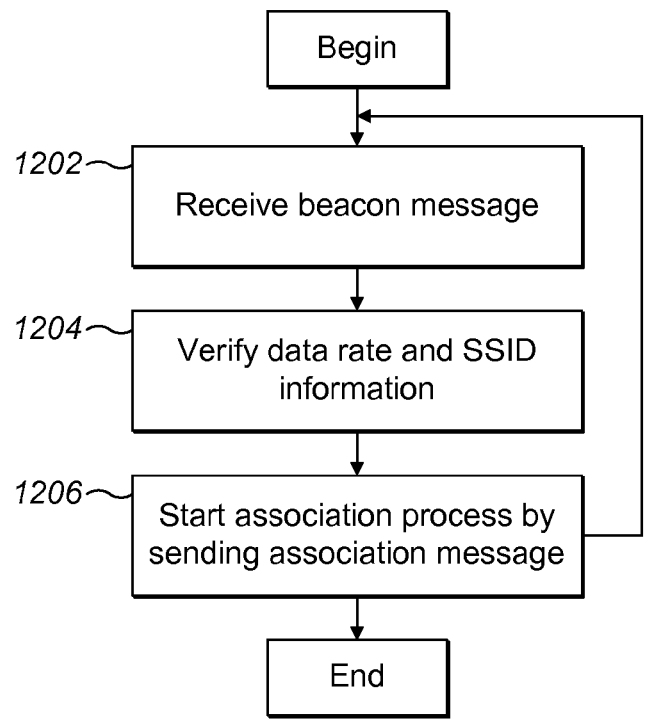
FIG. 12 shows the Smart device associating with the SAP after receiving the Beacon message with matching SSID.

Meanwhile as shown in FIG. 11, the Mule sends probe requests messages for all the SSIDs from the list as per the standard. It obtains the next SSID from its list 1102, and constructs the probe request message with the SSID and the data rate it can support 1104 and sends the probe request message with that SSID. When the Beacon message is received 1202 from the SAP, the Mule sends an association message 1206 after verifying the data rate and SSID information 1204 that came as part of the probe response message. This is shown as part of FIG. 12.

Figure 13:
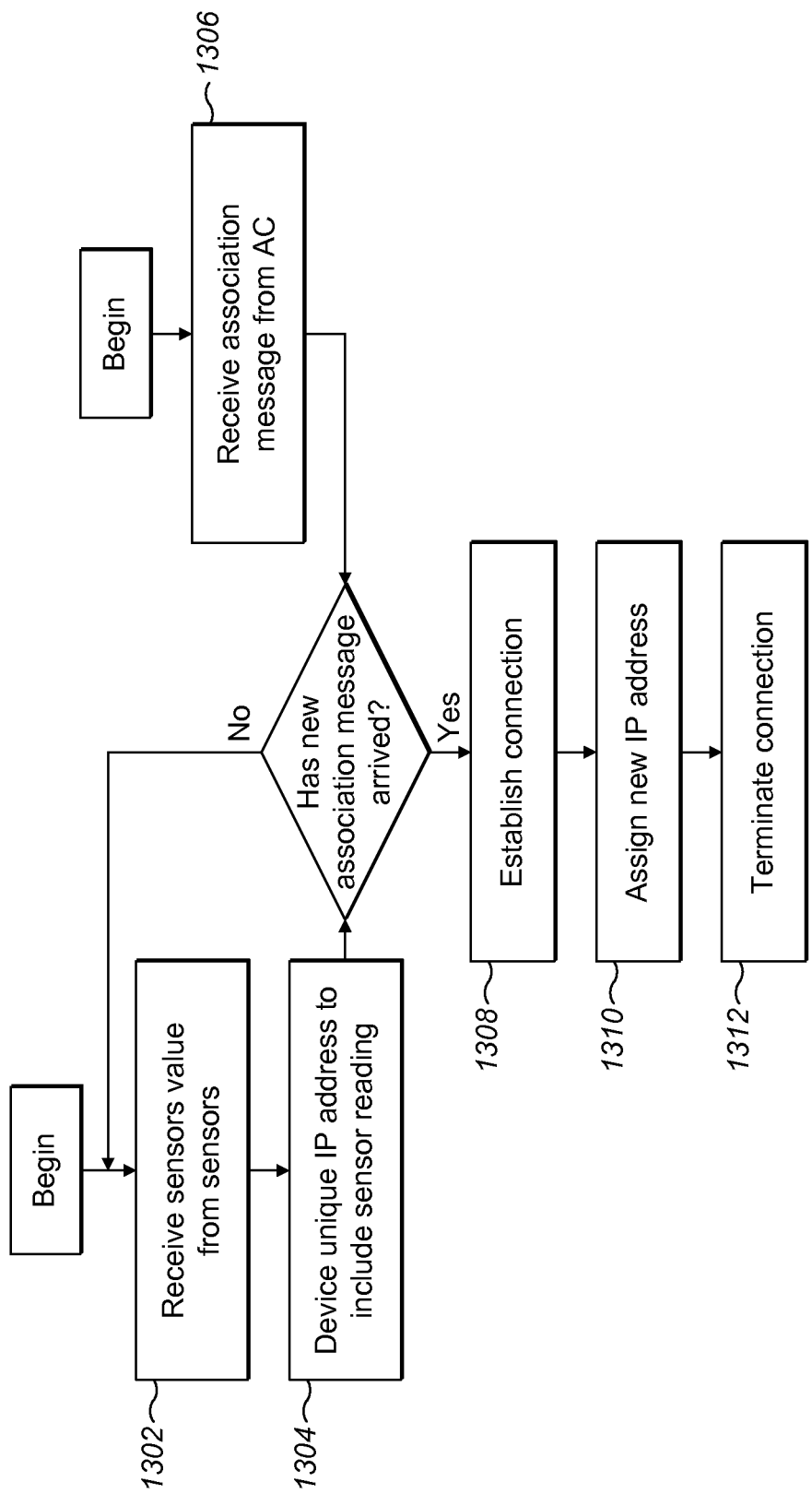
FIG. 13 shows the SAP's innovative mapping function of taking the sensor value received from the sensors and embeds it to a unique IP address. When an association message is received from the AC (namely Smart device), the IP address is assigned to the AC for establishing a connection with SAP.

When SAP receives the association message from the Mule, also known as Access Client (AC) 1306, it establishes a formal connection 1308 as per the standard by assigning a new IP address 1310 before terminating the connection 1312. This is shown in FIG. 13. The most important part of the innovation is the reading of the sensor value from the sensors 1302 and being ready with the unique IP address that has the sensor value embedded 1304. When the new IP address is assigned to the Mule 1310, the Mule records that IP address.

Figure 14:
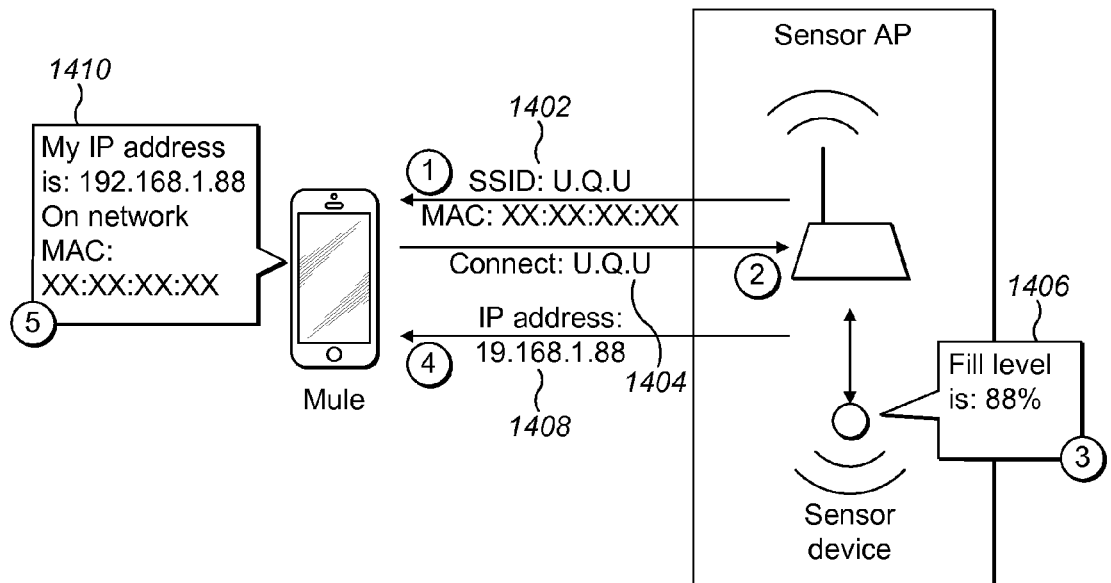
FIG. 14 shows an example of the steps that are taken during the association phase. SAP associates with the new IP address that has the sensor value embedded in it. IP assignment example is an illustration, and other complicated encoding methods do exist.

FIG. 14 provides an example on how the process of association works. In Step 1, we see the SAP sending Beacon message, for which in Step 2, the Mule sends back a probe and association message. Independently, in Step 3, the sensors collect the sensor data 1406. On the receipt of the association request, the SAP establishes connection by providing a new IP address, as shown in Step 4. In example, the IP address is 192.168.1.88, where the number 88 is the sensor value being embedded into the IP address and cloaked to the Mule. Please note that the IP address example given is a straight forward method to encode the information. There can be other sophisticated encoding algorithms used to fill the information within the IP address. Step 5 shows the association of the IP address to the Mule. These important sets of steps define the unique method with which a sensor data can be transferred to the Mule without disturbing the Mule's owner for any input, while staying within the purview of the standard.

Figure 15:
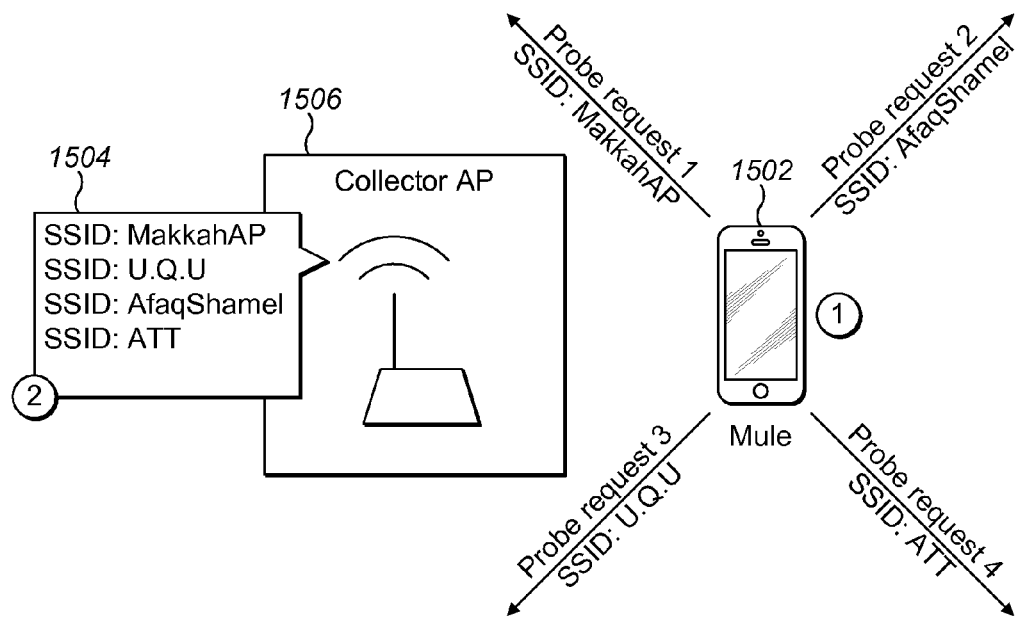
FIG. 15 shows the steps taken when the mule (namely Smart device) reaches close to the Collector hub (namely Collector Access Point). The Smart device completes the same process of advertising all the SSIDs it had associated with in the past. The Collector AP (CAP) learns from the Smart device all the SSIDs by receiving the Probe Request messages.

The second set of interactions of this innovation happen when the Mule reaches within the circle of influence of the data collection hub. FIG. 15 continues the example in FIG. 14 to illustrate the steps taken at the collection hub side. The collection hub has a wireless interface in the form of Collector AP 1506 through which it collects the information gathered by the Mule 1502. When the Mule reaches the vicinity of the Collector AP, as per standard the Mule sends Probe request to the Collector AP to find a partner to associate with. This is very similar to what the Mule did as per standard, with the SAP. In Step 1, we can see the Mule 1502, sending probe requests for the SSIDs it has in its list. On receipt of the probe requests, in Step 2, the Collector AP 1506 learns the SSIDs that Mule has sent. In example, we see four SSIDs that have been relayed by the Mule to collector AP.

Figure 16:
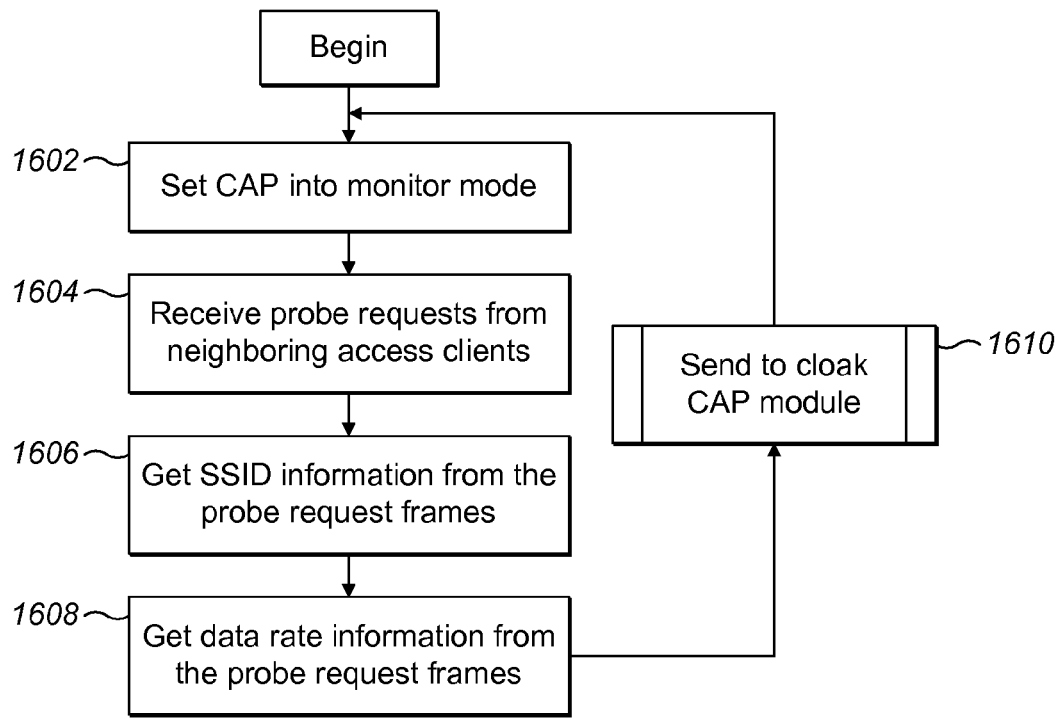
FIG. 16 illustrates the data collection mechanism within the CAP. CAP, in monitor mode, receives the Probe Request messages from the Smart devices and learns the SSIDs.

FIG. 16 shows the formal flow chart of the steps taken by the collector AP (CAP) to receive the information from the Mule (also known as Access Clients). The CAP is set into monitor mode to be ready to receive probe requests from the Mule 1602. Mule sends probe requests constantly to find an association. CAP receives the probe requests 1604 and deciphers the SSID 1606 and data rates 1608. CAP sends the collected information to cloak CAP module for processing 1610.

Figure 17:
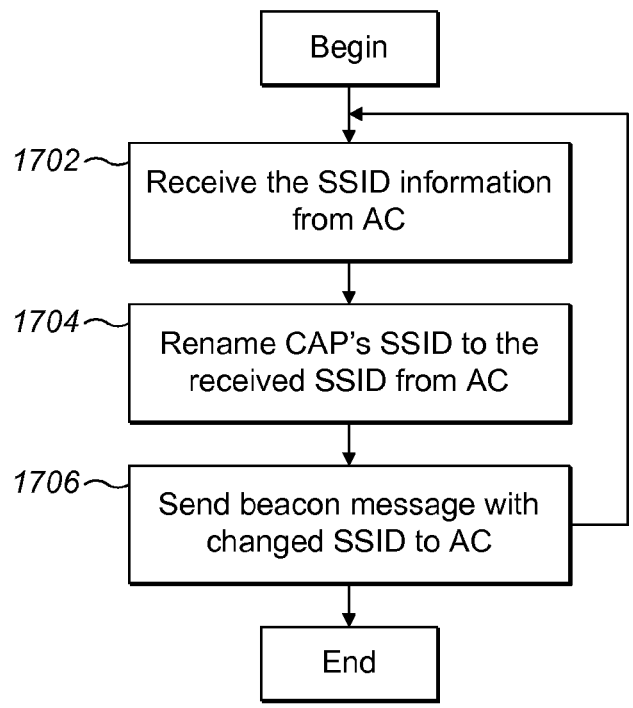
FIG. 17 illustrates the Cloak module within CAP that takes the SSIDs received through Probe Request message from a Smart device and sends a Beacon message matching the SSIDs, making the Smart device believe it is interacting with an AP it had already associated with in the past.

FIG. 17 shows the sequence of instructions followed by the Cloak CAP module after it receives the SSID 1702. Cloak CAP module renames CAP's SSID to the one received from Mule and sends a probe request message 1706 with the changed SSID as per the standard. This allows the Mule to associate with CAP using the same SSID it had sent probe requests with.

Figure 18:
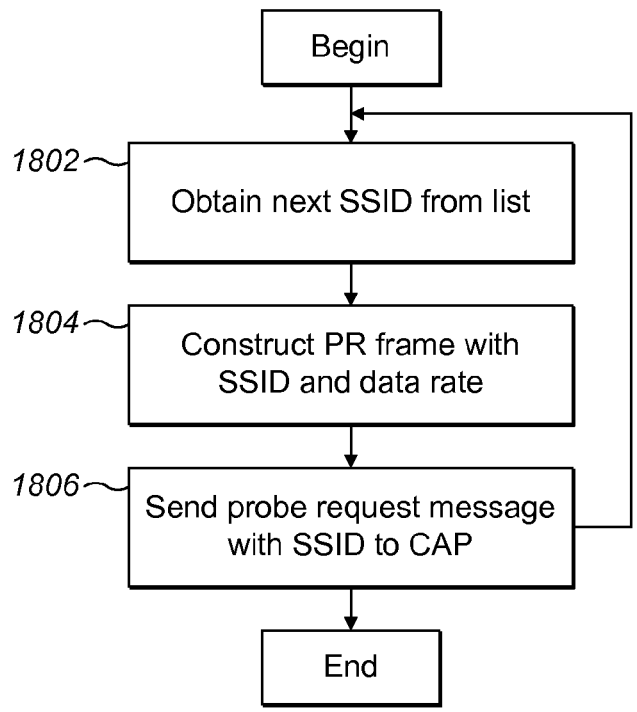
FIG. 18 shows the steps taken by the Smart device to send a Probe Request message to the CAP.

FIG. 18 shows the Mule sending the probe request message by going through the SSID list 1802. The list contains the SSIDs of the access points the Mule had associated earlier. The Mule constructs the probe request message with SSID and data rate information 1804 and sends the probe request message to CAP 1806.

Figure 19:
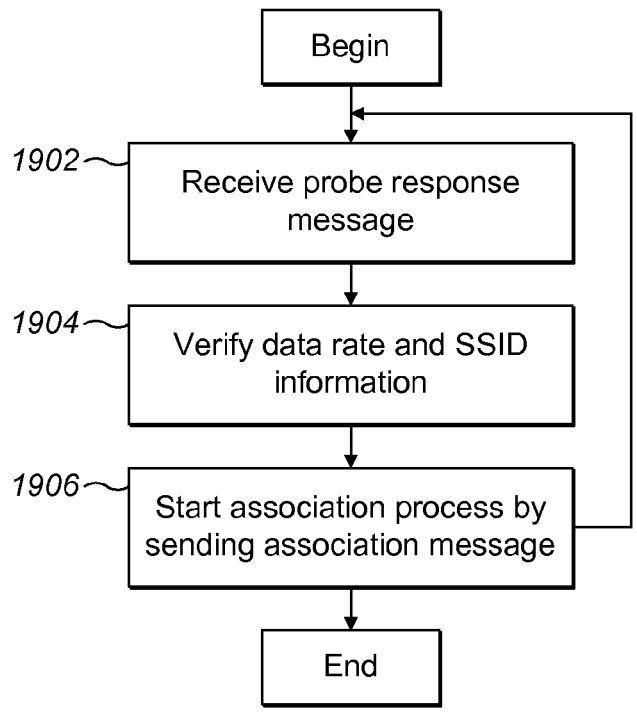
FIG. 19 shows the steps taken by the Smart device after receiving the Probe Response message from the CAP relaying the cloaked SSID.

Similarly, as shown in FIG. 19, on receiving the probe response message 1902 verifies the data rate and SSID information sent in the message 1904 and starts the association process to the CAP. CAP had used the same SSID sent by the Mule earlier as shown in FIG. 17.

Figure 20:
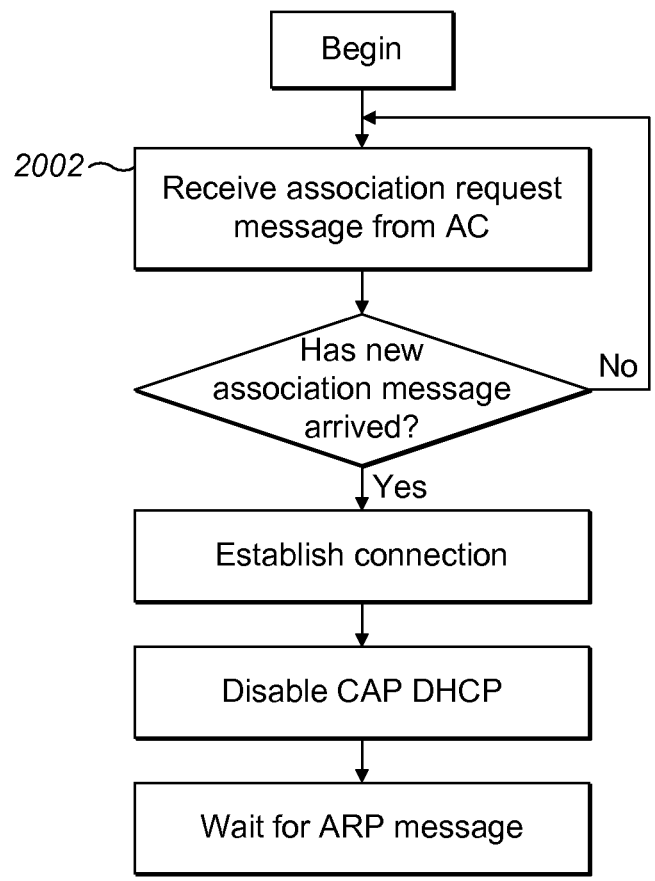
FIG. 20 shows the steps taken between CAP and Smart device to establish connection between them.

FIG. 20 shows the connection establishment process in the CAP. On receipt of the association request from the Mule 2002, CAP establishes connection and disables the Dynamic Host Configuration Protocol (DHCP). This process makes the Mule request for an IP address by initiating Address Resolution Protocol (ARP) message.

Figure 21:
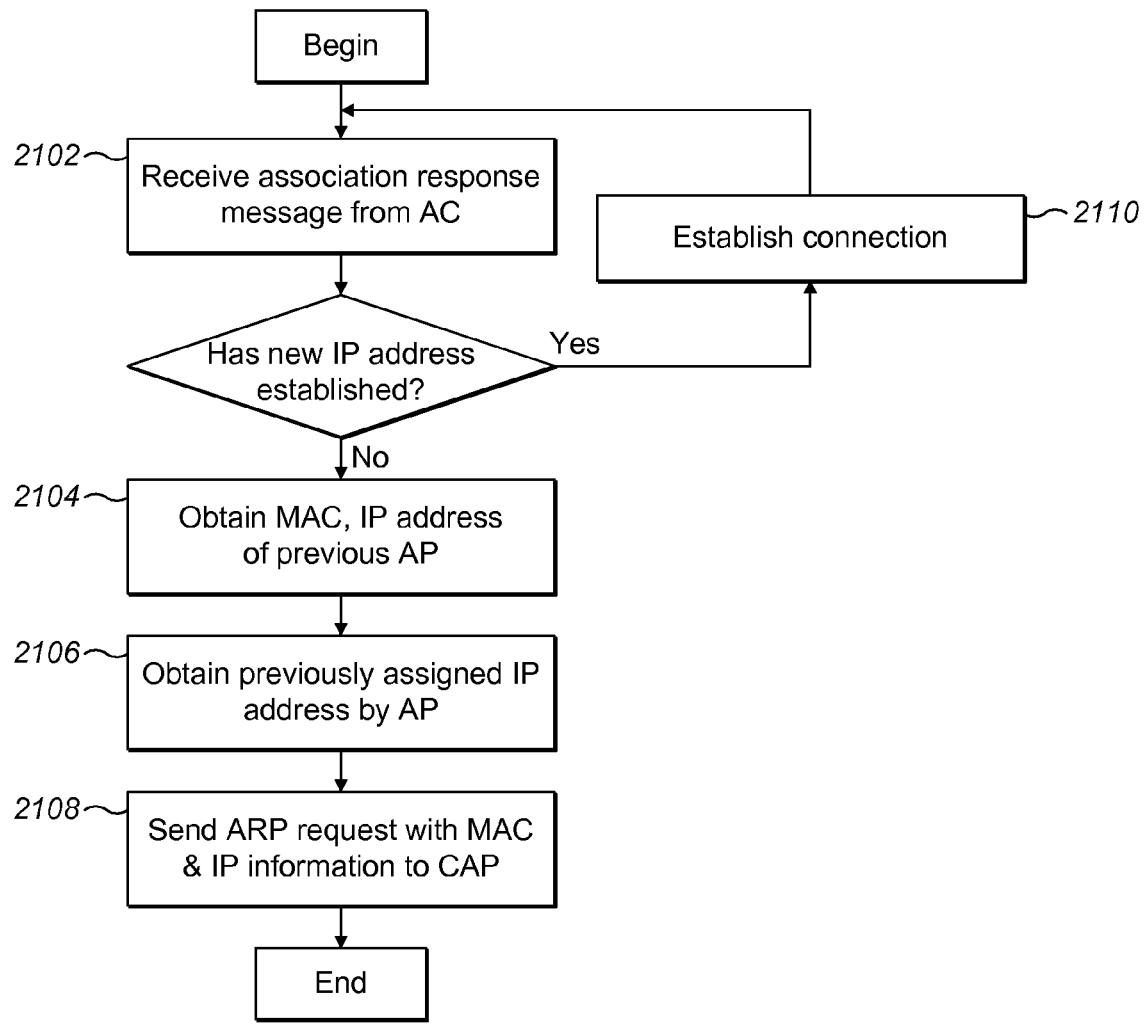
FIG. 21 shows the initiation of Address Resolution Protocol (ARP) message from Smart device AC to the CAP by relaying the previously assigned IP address and MAC address.

FIG. 21 shows the steps taken by the Mule when the connection establishment process is initiated by the CAP without providing an address. On the receipt of the association response message for connection establishment from the Mule 2102, Mule obtains the MAC address and IP address of the previous Access point 2104 and sends an ARP request with the MAC and IP information to CAP 2108. This IP address revealed to the CAP by the Mule as part of the ARP process is very important piece of the innovation as the IP address contains the information embedded as part of it by the SAP.

Figure 22:
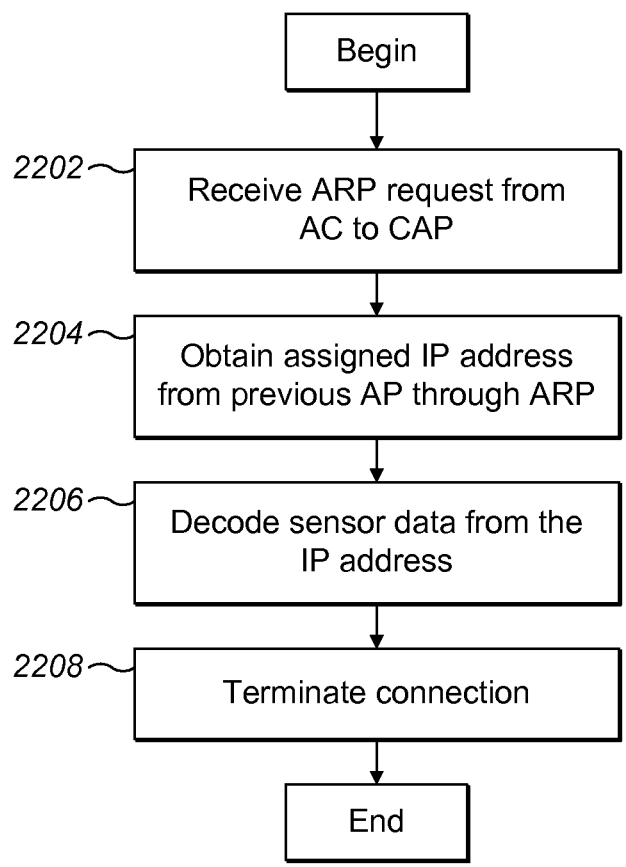
FIG. 22 shows the steps taken by the CAP to decode the sensor data using the IP address that was relayed as part of ARP by the Smart device Access Client. This completes the relaying of the sensor data from the SAP to CAP.

CAP receives the ARP from Mule 2202 and also receives the IP address previously assigned to it 2204. The sensor data embedded in the IP address is decoded from the IP address 2206 and the connection is terminated 2208. The process is shown in the FIG. 22 flowchart.

Figure 23:
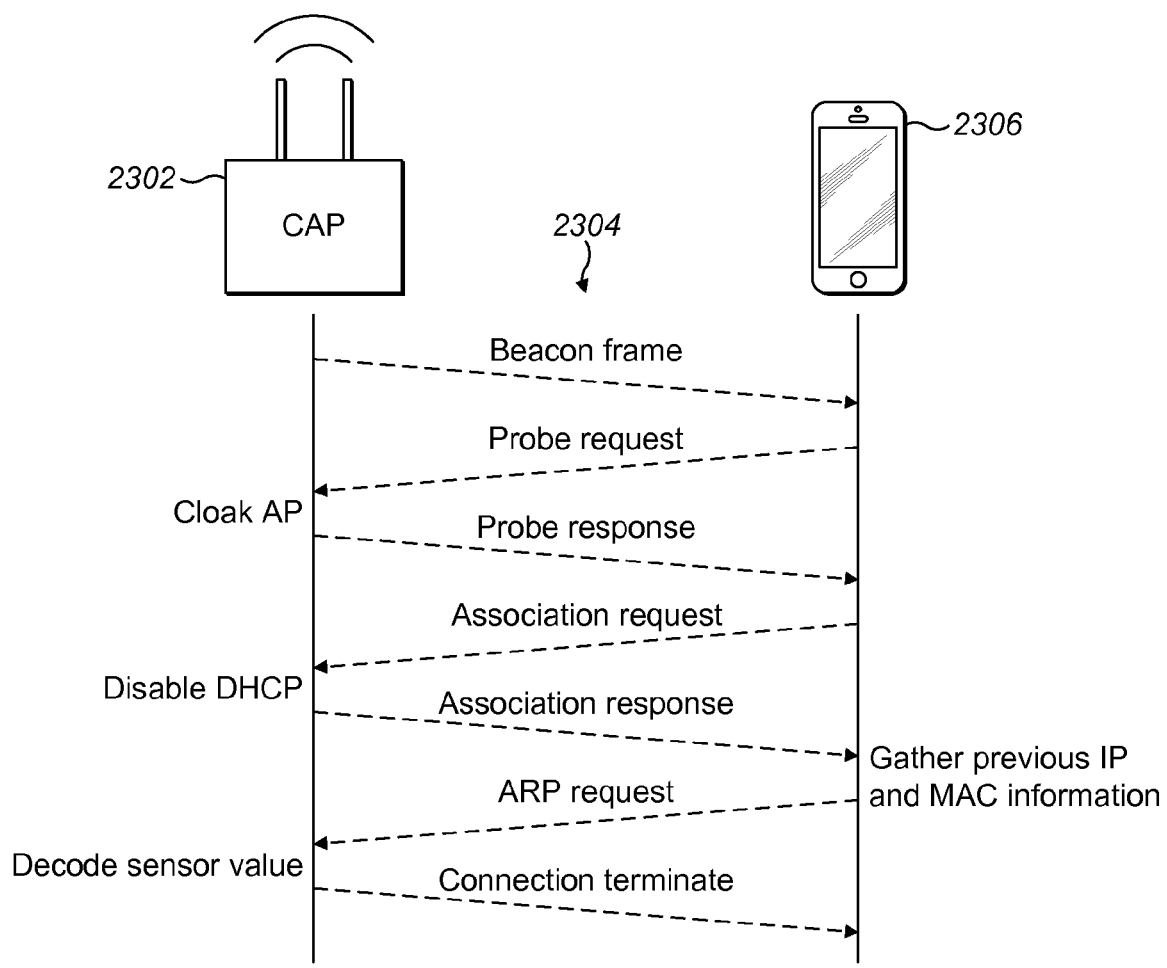
FIG. 23 shows the full message sequence between CAP and Smart device AC.

Therefore for every SSID in the list, Mule 2306 sends a probe request on receipt of a beacon frame from CAP 2302. On receipt of a probe request, Cloak AP module responds as if it is that SSID by converting itself into that SSID. The Mule sends an association request, which is accepted by CAP without assigning an IP address. Mule initiates an ARP process on receiving an association response without IP address. The ARP process reveals the MAC address and previously assigned IP address, which is enough for CAP to decode the sensor value that is embedded as part of the IP address. CAP terminates the connection as it has achieved its purpose of receiving the sensor value. This whole process is described in FIG. 23.

INDUSTRIAL APPLICABILITY

Accordingly, the specification and drawings are to be regarded in an illustrative rather than a restrictive sense. The invention is valid for general wireless network that works under IEEE 802.11a/b/g/n/ac standards. The invention works with general standards associated with IP networks, such as DHCP, and ARP. The invention does not require any special permission to be generated on the smart devices. The hall mark of the invention is that it works seamlessly and silently in the background without any disturbance to the smart device owners to carry on the sensor data using them as a Mule. The invention is directly applicable to industry as majority of the smart devices have WiFi interfaces and can be used immediately. Please note that the procedure works well with devices that show the previous IP and MAC connectivity. As mentioned earlier Apple uses this for all its devices today.

What is claimed is:

1. A method, comprising;
receiving a sensor data from a sensor using a Sensor Access Point (SAP) and embedding the sensor data in an IP address format using an electronic communication device;
retrieving the embedded sensor data from the internet protocol (IP) address provided as part of the address resolution protocol (ARP) sequence by a mule to the access point in a collection hub;
associating an access point at the collection hub with an access client uniquely by not providing the IP address and forcing the mule to initiate the (ARP) request and providing a pre learnt IP address for communicating; and
transferring the embedded sensor data contained inside the IP address format to the mule to the collection hub.

2. The method of claim 1, further comprising:
transferring the sensor data seamlessly and without any involvement of the smart device owner, while conforming to the IEEE (Institute of Electrical and Electronics Engineers) 802.11 protocol standard to the collection hub.

3. The method of claim 2, wherein the process does not use any extra processing cycles in the mule than what it would normally do as part of handling standard related message processing, wherein the mule is a smart device.

4. The method of claim 2, wherein receiving and transferring steps do not use any extra data bandwidth than what it would normally transfer and receive as part of handling a standard related message.

5. The method of claim 2, further comprising:
terminating the association once the sensor data is retrieved by the collection hub residing in the mule.

6. A method, comprising:
monitoring for a sensor data using a mobile device having a wireless protocol to carry the sensor data from one point to another;
collecting a data from a client to through a sensor residing in the mobile device without the mobile device user being aware of it;
retrieving the embedded sensor data from the internet protocol (IP) address provided as part of the address resolution protocol (ARP) sequence by a mule to the access point in a collection hub;
associating an access point at the collection hub with an access client uniquely by not providing the IP address and forcing the mule to initiate the (ARP) request and providing a pre learnt IP address for communicating; and
transferring seamlessly the sensor data information to the collection hub by using the mobile device as a mule without having an overhead to the smart device while conforming to a wireless IEEE 802.11 and an IP standard.

7. The method of claim 6, further comprising:
sending a probe request data for the prospective mobile device working the mule;
cloaking a Sensor Access Point (AP) entry in the mule;
receiving a probe request message;
deciphering a service set identifier (SSID) information using SAP; and
receiving data from the probe request frame.

8. The method of claim 6, further comprising:
terminating the association once the sensor data is retrieved by the collection hub residing in the mule.

* * * * *